United States Patent [19]

Gabrlik et al.

[11] Patent Number: 4,732,188
[45] Date of Patent: Mar. 22, 1988

[54] FUEL TANK CAP WITH PRESSURE/THERMAL RELIEF

[75] Inventors: Zdenek Gabrlik, Brier; John M. Morris, Auburn; Nelson O. Phillips, Vashon; Timothy L. Oliphant, Federal Way, all of Wash.

[73] Assignee: GT Development Corporation, Tukwila, Wash.

[21] Appl. No.: 62,554

[22] Filed: Jun. 15, 1987

[51] Int. Cl.⁴ .............................................. F16K 13/04
[52] U.S. Cl. ...................................... 137/73; 220/203; 137/541
[58] Field of Search ................... 137/73; 220/896, 203, 220/207

[56] References Cited

U.S. PATENT DOCUMENTS

| | | | |
|---|---|---|---|
| 2,357,681 | 9/1944 | Morton | 220/896 |
| 2,375,832 | 5/1945 | Tyden | 220/896 |
| 3,040,264 | 6/1962 | Feinberg | 137/73 |

Primary Examiner—Harold W. Weakley
Attorney, Agent, or Firm—Joan H. Pauly; Delbert J. Barnard

[57] ABSTRACT

A valve plug (22, 22a, 22b) is biased inwardly by a spring (78, 78a, 78b) to close an opening (6, 6a, 6b) in a tank. A stem (32, 32a, 32b) extends axially inwardly from the plug (22, 22a, 22b). The stem (32, 32a, 32b) has an inner portion (36, 36a, 36b) which is mechanically interlocked with an outer portion (52, 52a, 52b) to directly transmit axial forces created by the spring (78, 78a, 78b). Fusible material (66, 66a, 66b) holds the stem portions (36, 36a, 36b, 52, 52a, 52b) in an interlocking position but carries only relatively small loads. The plug (22, 22a, 22b) and stem (32, 32a, 32b) move against the force of the spring (78, 78a, 78b) to relieve pressure. At elevated temperatures, the fusible material (66, 66a, 66b) melts to allow the stem portions (36, 36a, 36b, 52, 52a, 52b) to separate and the plug (22, 22a, 22b) and outer stem portion (52, 52a, 52b) to move away from the opening (6, 6a, 6b).

31 Claims, 17 Drawing Figures

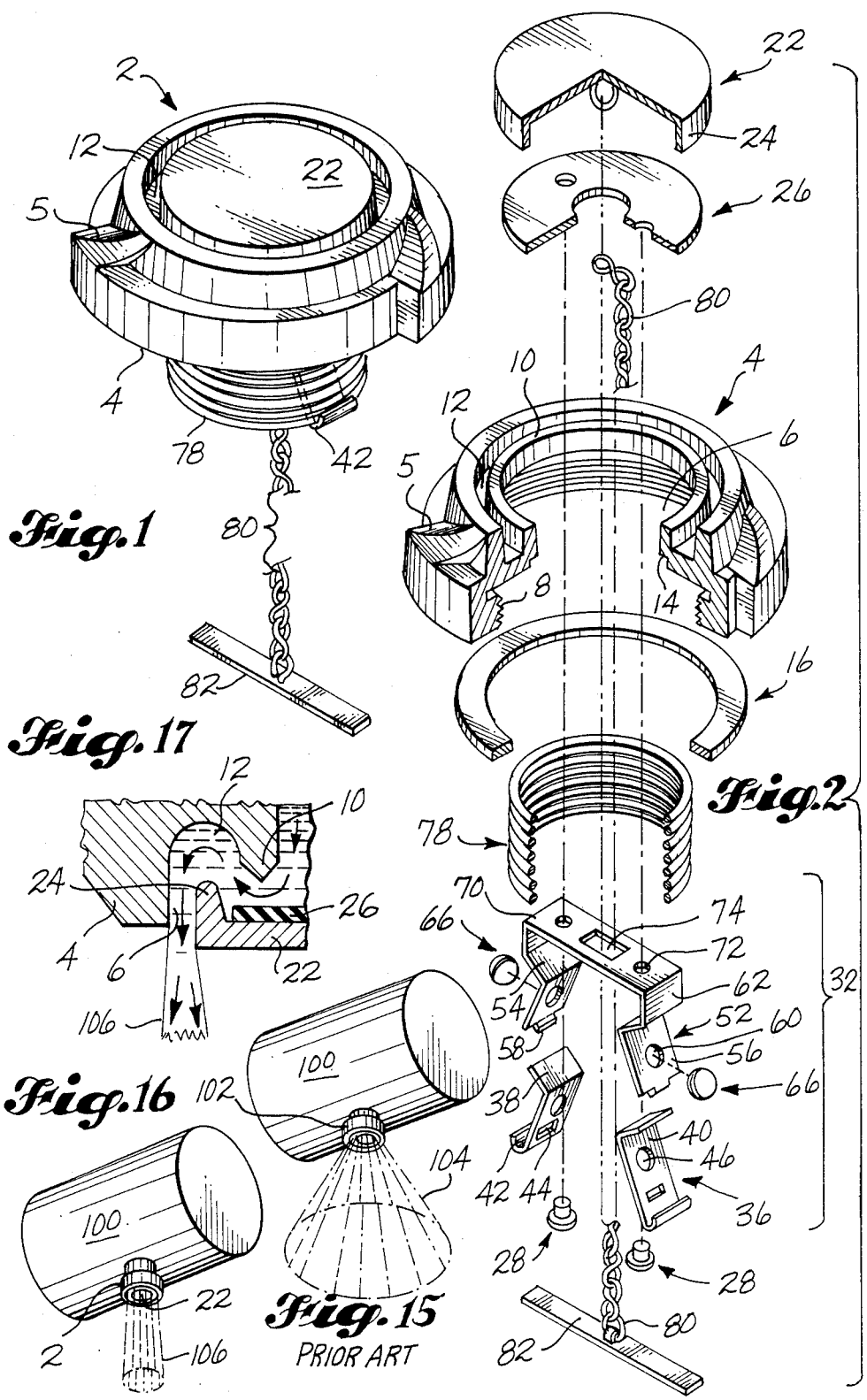

FUEL TANK CAP WITH PRESSURE/THERMAL RELIEF

TECHNICAL FIELD

This invention relates to pressure relief valves and, more particularly, to such a valve in a fuel tank cap which has an inwardly biased valve plug and stem for pressure relief, with mechanically interlocking inner and outer portions of the stem being held in an interlocking position by a fusible material which melts at elevated temperatures to allow the plug to move away from the valve seat.

BACKGROUND ART

Fuel tanks on vehicles are subject to a number of safety requirements. These requirements include a venting system for relieving pressure in the tank when such pressure exceeds a predetermined level and a thermal relief system for preventing explosions when the temperature in the tank becomes excessive.

One known type of venting system is a pressure relief valve having a valve plug that is positioned outwardly of a vent opening in the valve housing and is spring biased to close the opening. A valve stem is attached to the plug and extends inwardly therefrom into the tank. The inner end of the stem carries a spring abutment for one end of a compression spring. The other end of the spring abuts the valve housing around the vent opening. The spring is calibrated to allow the valve plug and stem to move outwardly to relieve pressure when the pressure exceeds a predetermined level and to reseat the valve plug to close the vent opening when the pressure drops back down to an acceptable level. This valve arrangement has the advantages of simplicity of construction, reliability, and low cost.

One approach to providing thermally activated pressure relief is the use of a fusible material that melts at elevated temperatures to cause a vent opening or openings to be uncovered. The fusible material may itself be the cover for the opening, or it may be used to attach a nonfusible material cover to another portion of the venting structure. The latter arrangement has the advantages of allowing a relatively large opening to be uncovered very quickly and of requiring only small amounts of fusible material.

In known tank safety systems which have a pressure relief valve and thermal relief based on the melting of fusible material, the relief valve and thermal relief are provided separately. The separate provision of pressure activated relief and thermal activated relief tends to complicate the overall structure of the safety system.

Tank pressure relief valves having a spring biased valve plug and a stem which carries a spring abutment, as described above, are disclosed in U.S. Pat. Nos. 1,994,770, granted Mar. 19, 1935, to G. W. King; and 3,918,606, granted Nov. 11, 1975, to R. D. Keller. Other types of pressure relief valves are disclosed in U.S. Pat. Nos. 2,489,787, granted Nov. 29, 1949, to E. W. Knowlton; and 4,458,711, granted July 10, 1984, to F. S. Flider. The Knowlton and Flider devices also include fusible portions that cover vent openings and melt to uncover such openings. Flider discloses a vent valve with a plastic housing which has a thin walled breakaway portion to provide an enlarged aperture under severe over-pressurization and which melts under severe fire conditions to provide an even larger aperture for maximum venting. U.S. Pat. No. 3,669,302, granted June 13, 1972, to M. Markarian, discloses an electrolytic capacitor that has a vent opening sealed by a fusible material.

C. J. Green discloses valves for relieving pressure and preventing liquid spillage in U.S. Pat. Nos. 4,325,398, granted Apr. 20, 1982; 4,457,325, granted July 3, 1984; and 4,487,215, granted Dec. 11, 1984. Each of these three patents also discloses the use of fusible material for attaching a portion of the valve housing that covers a large vent opening to the rest of the housing.

The above patents and the prior art that is discussed and/or cited therein should be studied for the purpose of putting the present invention into proper perspective relative to the prior art.

DISCLOSURE OF THE INVENTION

In broad terms, the goal of the present invention is to incorporate the concept of thermal relief achieved by the melting of a fusible material into the previously described type of valve structure which has a biased valve plug and stem. The applicants perceived that this could be accomplished by incorporating into the valve stem a fusible material connection that would melt at elevated temperatures to allow the valve plug and part of the stem to separate from the reset of the stem and move away from the vent opening. This approach presented a major problem. The stem in such a valve arrangement is subjected to significant tension forces by the biasing means, proportional to the amount of pressure required to activate the valve to vent the tank. Known fusible materials that are practical for use in a tank termal relief mechanism do not have sufficient strength to maintain their structural integrity at realistic venting pressures. Therefore, fusible materials would not be suitable for use as a load-carrying link in a valve stem. The solution arrived at by the applicants was to divide the valve stem into two separate portions made from a strong material with the portions being arranged relative to each other to provide a continuous load path for tension forces, and to incorporate fusible material to maintain the valve stem portions in a mechanically interlocking, load-transmitting position. In this type of arrangement, the stress on the fusible material can be maintained at an acceptable low level within the strength limitations of the fusible material.

A subject of the invention is a pressure relief valve for a tank. According to an aspect of the invention, the valve comprises a valve plug positioned outwardly of an opening in the tank and a stem having an outer portion attached to the valve plug and an inner portion. Biasing means exerts an axial, inward force on the inner portion of the stem to put the stem in tension and bias the valve plug into a position in which it closes the opening. The inner and outer portions of the stem have means forming a mechanical interlock to transmit axial forces directly to each other. The stem includes fusible material positioned to maintain the inner and outer portions in a mechanically interlocking position. The biasing means is resilient to allow the stem and the valve plug to move outwardly in response to increased pressure in the tank to relieve pressure in the tank. The fusible material is meltable at elevated temperatures exceeding a predetermined level, to allow the inner and outer portions of the stem to separate from each other and the valve plug and the outer portion to move away from the opening.

Preferably, the means forming a mechanical interlock comprises generally laterally extending surface portions of the inner portion of the stem, and generally laterally extending surface portions of the outer portion of the stem abutting said surface portions of the inner portion to transmit axial forces. In the first and second preferred embodiments of the invention, the inner and outer portions have adjacent hole means, and the fusible material fills the hole means to maintain the inner and outer portions in a mechanically interlocking position. The hole means extends through generally inwardly extending portions of the inner and outer portions.

The stem may take a variety of forms. A first preferred form of the stem comprises a plurality of peripherally spaced legs each of which includes an inner member and an outer member. The inner members form the inner portion of the stem, and the outer members form the outer portion. Preferably, the inner members bend at their inner ends to form a spring abutment for the biasing means. In the first preferred embodiment of the invention, in each leg, the inner and outer members abut each other along surface portions that extend generally laterally, to form a part of the mechanical interlock, and then generally inwardly. The outer member terminates at its inner end in a generally lateral projection. The inner member has an opening for receiving this projection. The fusible material fills hole means extending generally laterally through the inner and outer members to maintain the inner and outer members in a mechanically interlocking position.

In another embodiment of the invention, the inner and outer members of each leg abut each other along generally laterally extending surface portions, and the fusible material is positioned laterally between the legs to maintain the legs in a laterally spaced position and the inner and outer members in a mechanically interlocking position. Preferably, each inner member has a generally inwardly extending portion with a laterally facing recess into which the fusible material extends.

A preferred feature is substantially inwardly extending surfaces of each outer member that are substantially perpendicular to said abutting surface portions and that abut opposite surfaces of the inner member to inhibit movement of said surface portions of the inner member along said surface portions of the outer member. In the third preferred embodiment of the invention, the outer member of each leg has a generally inwardly extending portion with an interlock opening extending laterally therethrough and partially defined by an inner edge and opposite side edges, and a generally laterally extending portion extending from said inner edge. The inner member has a generally laterally extending portion that projects through the interlock opening. The opposite side edges of the opening form said substantially inwardly extending surfaces.

Another preferred feature is pin means slidably extending through holes that extend laterally through the inner members. The pin means connects the inner members to each other. The holes are positioned inwardly of the fusible material which is positioned inwardly of the outer members and between the inner members. In embodiments with this feature, the pin means prevents the inner members from pivoting about the outer or top edges of the fusible material. It also serves as a deterrent to tampering with the stem structures.

Another subject of the invention is an improvement in a cap for closing a fuel tank filling and venting tube of the type having a main body with a central axial opening and means for detachably engaging the tube, and a pressure relief valve. The valve has a valve plug positioned outwardly of the opening, a stem attached to the valve plug, and biasing means for exerting an inward force on the stem to put the stem in tension and bias the valve plug into a position in which it closes the opening. According to an aspect of the invention, the improvement comprises an inner portion of the stem including a first component of a mechanical interlock, an outer portion of the stem including a second component of the mechanical interlock, and fusible material positioned to maintain the inner and outer portins in a mechanically interlocking position to transmit axial forces directly between the inner and outer portions. The biasing means is resilient and the fusible material is meltable as described above.

A preferred feature of the invention is an arrangement in which the valve plug has an inwardly extending peripheral flange, and the body of the cap has an annular recess surrounding said axial opening for receiving the flange. The flange and recess are dimensioned so that, when the stem and valve plug move outwardly to relieve pressure in the tank, a portion of the flange continues to project into the recess. This causes fuel spillage from the overturned tank to be in a substantially cylindrical pattern. The cylindrical pattern helps to limit the spread of spilled fuel.

Apparatus constructed in accordance with the present invention has the advantage of maximizing the simplicity of construction and cost effectiveness of a tank safety system which provides both pressure activated relief and thermally activated relief. This is accomplished by combining into a single mechanism two basic concepts without sacrificing the simplicity of construction, reliability, and low cost advantages of either of the concepts. In apparatus constructed in accordance with the invention, pressure activated venting to relieve pressure is accomplished in a known manner by movement of a valve plug and attached stem in opposition to a biasing means. In addition, fusible material is employed to provide simple, reliable, and inexpensive thermally activated relief. In the unique structure of the invention, fusible material is incorporated into the valve stem without undue complication of the stem structure and without any adverse impact on the venting function of the valve. The manner in which the fusible material is incorporated, as described above, provides simple and reliable thermally activated relief while avoiding the problem discussed above of the low strength of known fusible materials. The overall structure of the apparatus of the invention is durable, reliable, and easy and inexpensive to manufacture and maintain.

These and other advantages and features will become apparent from the detailed description of the best modes for carrying out the invention that follows:

BRIEF DESCRIPTION OF THE DRAWINGS

In the drawings, like element designations refer to like parts throughout, and:

FIG. 1 is a pictorial view of a fuel tank filling and venting tube cap incorporating a first preferred embodiment of the invention.

FIG. 2 is an exploded pictorial view of the cap shown in FIG. 1, with foreground portions cut away.

FIG. 15 is a pictorial view of the fuel spillage pattern from a tank equipped with a prior art cap.

FIG. 16 is a pictorial view of the fuel spillage pattern from a tank equipped with a cap incorporating one of the preferred embodiments of the invention.

FIG. 17 is a fragmentary sectional view of a portion of the cap shown in FIG. 16.

BEST MODES FOR CARRYING OUT THE INVENTION

Figure 3:
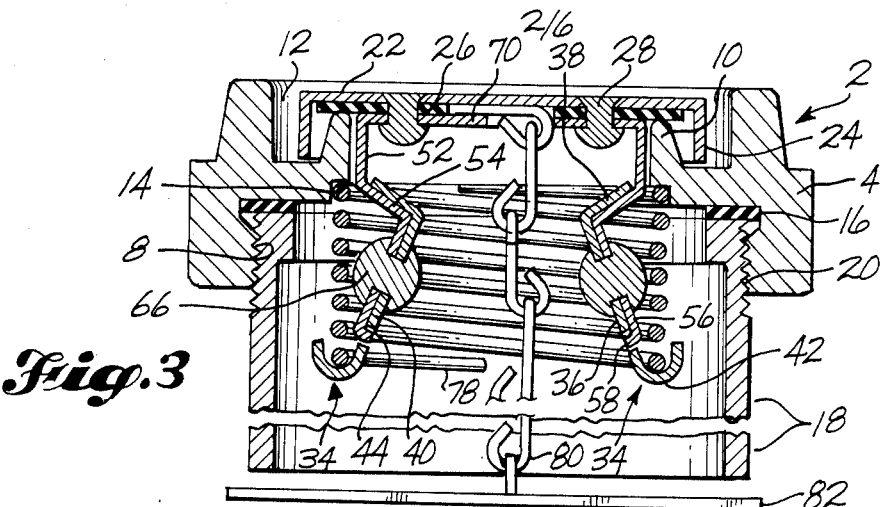
FIG. 3 is a vertical sectional view of the cap shown in FIGS. 1 and 2 attached to a tank filling and venting tube, with the valve plug shown in a closed position.

The drawings show three embodiments of a pressure relief valve that are constructed according to the invention and that also constitute the best modes of the invention currently known to the applicant. In the drawings, the valve of the invention is shown incorporated into a cap for closing a fuel tank filling and venting tube. It is anticipated this will be the primary application of the valve of the invention. However, it is of course to be understood that the valve of the invention may also be used to advantage in other types of installations separate from such a cap.

Figure 4:
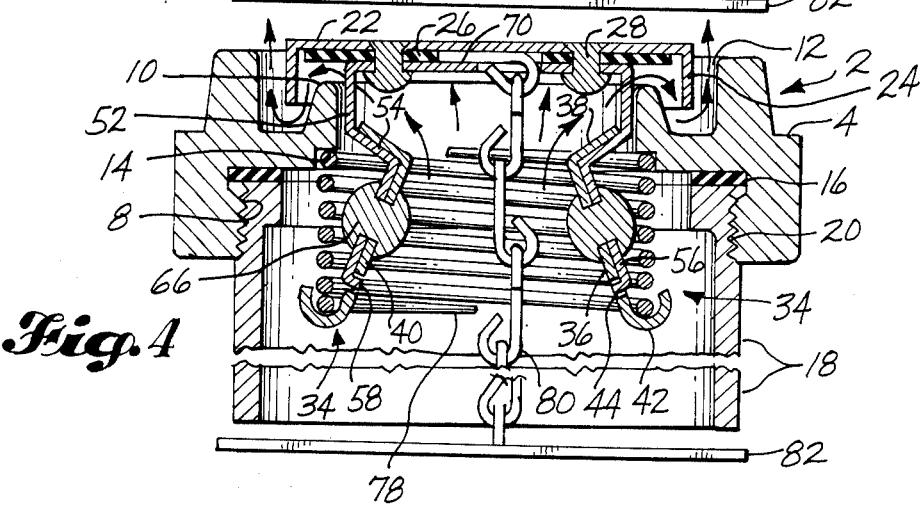
FIG. 4 is like FIG. 3 except that it shows the valve plug in a venting position.
Figure 5:
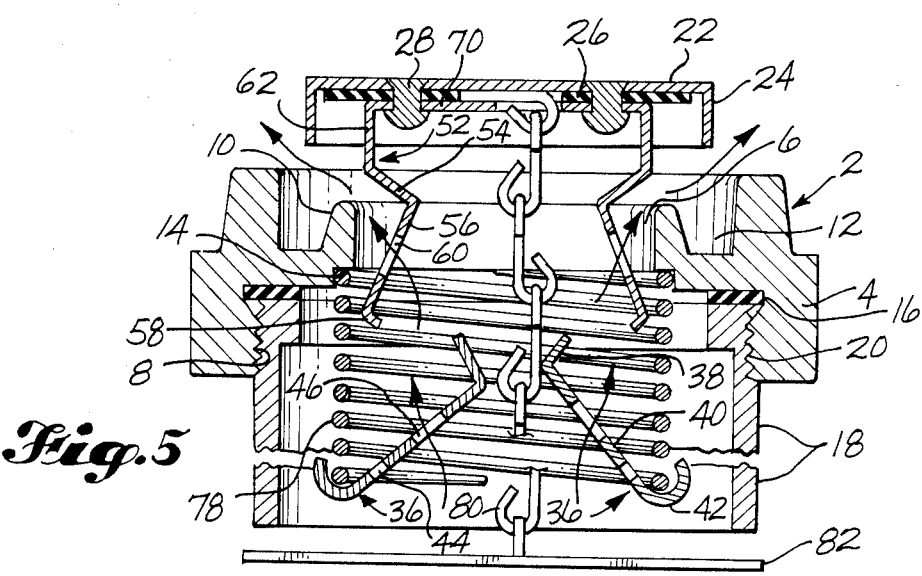
FIG. 5 is like FIG. 3 except that it shows the inner and outer portions of the valve stem separated and the valve plug moving away from the vent opening.
Figure 6:
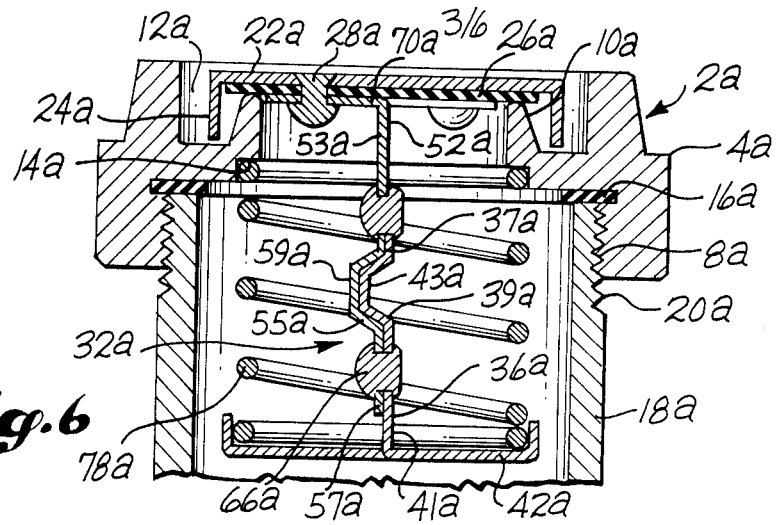
FIGS. 6–8 are similar to FIGS. 3–5 except that they show a second preferred embodiment of the invention.
Figure 7:
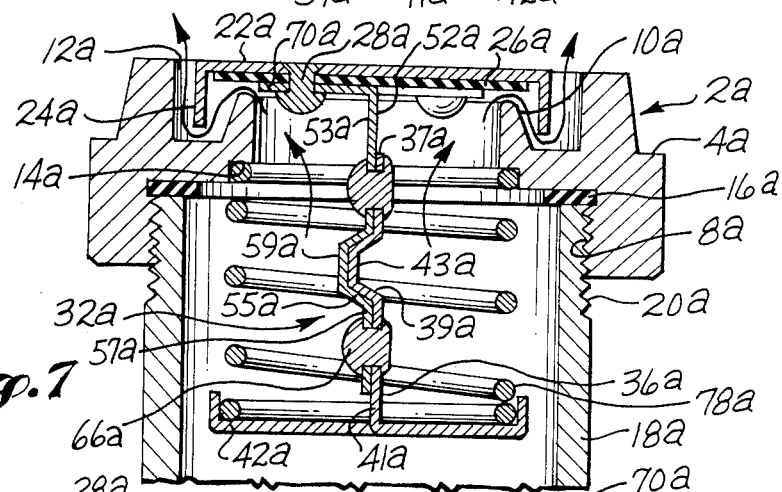
Figure 8:
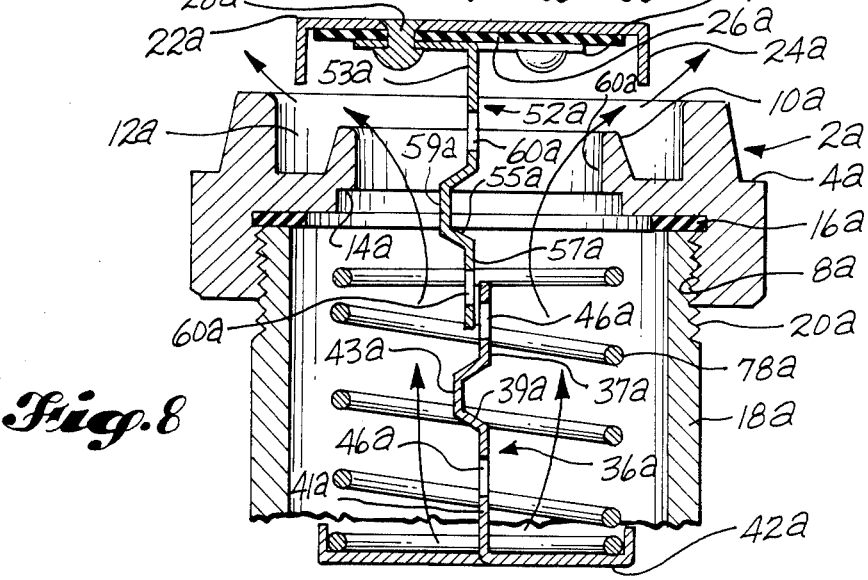
Figure 9:
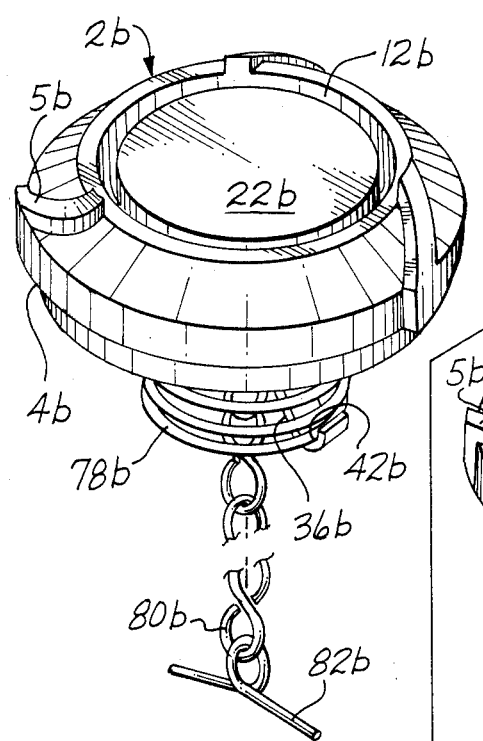
FIGS. 9–13 are similar to FIGS. 1–5 except that they show a third preferred embodiment of the invention.
Figure 10:
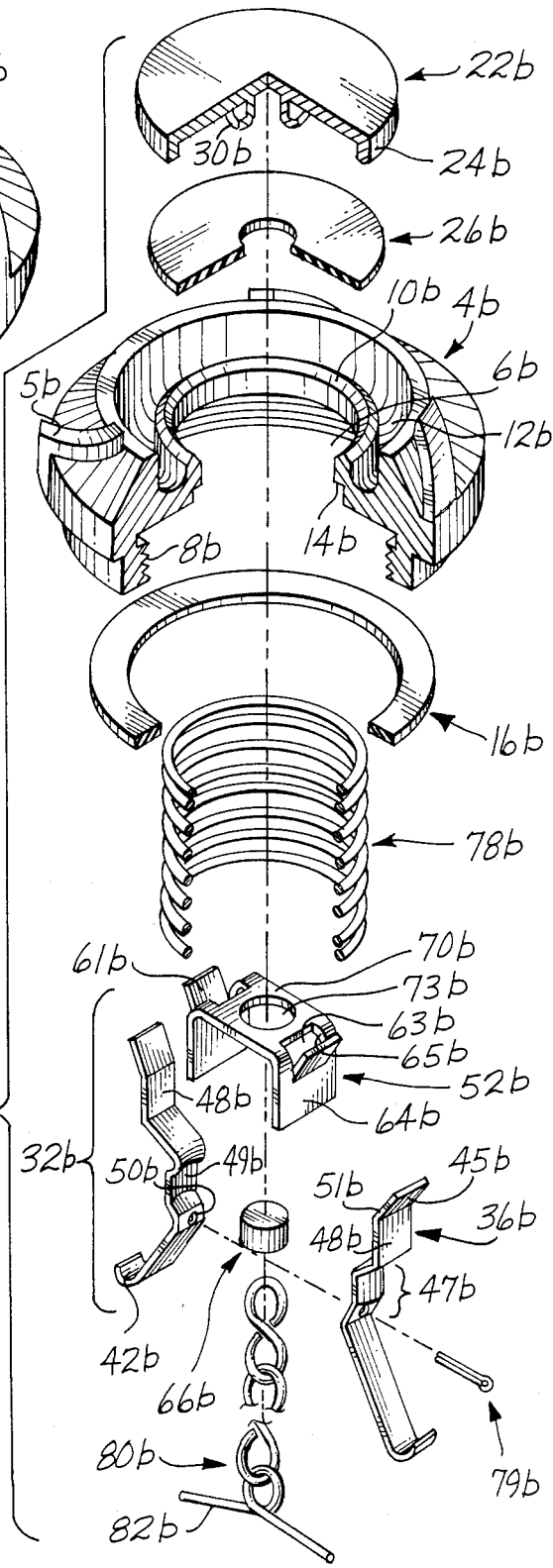

FIGS. 1–5 show a first preferred embodiment of the valve, FIGS. 6–8 show a second preferred embodiment, and FIGS. 9–14 show a third preferred embodiment. The reference characters in FIGS. 1–5 consist of numbers without any letter designation. The reference characters in FIGS. 6–8 consist of numbers with the letter designation "a". The reference characters in FIGS. 9–14 consist of numbers with the letter designation "b". Equivalent elements in FIGS. 1–5, 6–8, and 9–14 are designated by reference characters having like numeral portions.

In each of the embodiments of the invention shown in the drawings, the valve is shown incorporated into a cap 2, 2a, 2b for closing a fuel tank filling and venting tube 18, 18a, 18b. The cap 2, 2a, 2b has a main body 4, 4a, 4b with a central axial opening 6, 6a, 6b. The body 4, 4a, 4b has a downwardly depending rim with internal threads 8, 8a, 8b for detachably engaging threads 20, 20a, 20b on the tube 18, 18a, 18b. The top portion of the cap body 4, 4a, 4b has an upwardly extending annular projection 10, 10a, 10b and an annular recess 12, 12a, 12b positioned radially outwardly of the projection 10, 10a, 10b. The projection 10, 10a, 10b engages a seal 26, 26a, 26b carried by the valve plug 22, 22a, 22b, and the recess 12, 12a, 12b receives a valve plug flange 24, 24a, 24b, as described below. A spring abutment 14, 14a, 14b is formed in the top portion of the cap body 4, 4a, 4b below the projection 10, 10a, 10b. The cap body 4, 4a, 4b also carries a seal 16, 16a, 16b which sealingly engages the top surface of the tube 18, 18a, 18b when the cap body 4, 4a, 4b is threaded onto the tube 18, 18a, 18b to close the tube 18, 18a, 18b. The cap body 4, 4b shown in FIGS. 1, 2, 9, and 10 has the preferred feature of finger grips 5, 5b. These grips 5, 5b allow more torque to be applied to remove the cap 2, 2b than to tighten the cap 2, 2b, to in turn help prevent excessive tightening of the cap 2, 2b and facilitate removal of the cap 2, 2b.

In each of the three embodiments, the pressure relief valve includes a valve plug 22, 22a, 22b positioned outwardly of the axial opening 6, 6a, 6b in the cap 2, 2a, 2b. The plug 22, 22a, 22b includes a top radially extending portion and a flange 24, 24a, 24b extending axially downwardly from the periphery of such top portion. An annular seal 26, 26a, 26b is attached to the inside radial surface of the upper portion of the plug 22, 22a, 22b by fasteners 28, 28a or mounting projection 30b. When the valve plug 22, 22a, 22b is in its closed position, shown in FIGS. 3, 6, and 11, the flange 24, 24a, 24b projects into the cap body recess 12, 12a, 12b and the seal 26, 26a, 26b sealingly engages the cap body projection 10, 10a, 10b.

Each of the three embodiments of the valve includes a stem 32, 32a, 32b. The stems 32, 32a, 32b of the three embodiments differ in the details of their structure but have a number of basic characteristics in common. Each stem 32, 32a, 32b includes an outer portion 52, 52a, 52b attached to the valve plug 22, 22a, 22b and an inner portion 36, 36a, 36b. The inner and outer portions 36, 36a, 36b, 52, 52a, 52b include means forming a mechanical interlock. Preferably, the first and second components comprise abutting generally laterally extending surfaces of the inner and outer portions 36, 36a, 36b, 52, 52a, 52b. The stems 32, 32a, 32b also include fusible material 66, 66a, 66b that is positioned to maintain the inner and outer portions 36, 36a, 36b, 52, 52a, 52b in a mechanically interlocking position. The fusible material 66, 66a, 66b is preferably a low melting alloy such as a lead bismuth alloy.

The positioning of the fusible material 66, 66a, 66b may be carried out in a number of ways. In the preferred embodiments shown in FIGS. 1–8, the inner and outer portions 36, 36a, 52, 52a of the stems 32, 32a have adjacent generally inwardly extending portions 40, 37a, 41a, 56, 53a, 57a with holes 46, 46a, 60, 60a extending therethrough. The fusible material 66, 66a fills these holes 46, 46a, 60, 60a to maintain the inner and outer portions 36, 36a, 52, 52a in position. In the preferred embodiment shown in FIGS. 9–14, the stem 32b comprises two legs 34b, each of which includes an inner member 36b and an outer member 52b. The inner members 36b form the inner portion of the stem 32b, and the outer members 52b form the outer portion. The fusible material 66b is positioned laterally between the inner members 36b to maintain the inner members 36b in a laterally spaced position in which they are mechanically interlocked with the outer members 52b.

Referring to FIGS. 1–5, the stem 32 in the first preferred embodiment, like the stem 32b in the third preferred embodiment, comprises a pair of peripherally spaced diametrically opposed legs 34. Each leg 34 includes an inner member 36, and an outer member 52. The inner members 36 of the two legs 34 form the inner portion of the stem 32, and the outer members 52 form the outer portion. The stem 32 also includes a mounting plate 70 which joins the outer ends of the two outer members 52 and provides a means for securing the stem 32 to the valve plug 22. Fasteners 28 extend through the mounting plate 70 and the valve seal 26 and engage the top portion of the valve plug 22. Holes 72 are provided in the plate 70 for accommodating the fasteners 28. The leg members 36, 52 and plate 70 are preferably formed from flat steel strips.

The plate 70 also has a center hole 74 to accommodate the top link of a chain 80. The chain 80 is secured to the valve plug 22 by the mounting plate 70 as shown in FIGS. 3-5. The chain 80 is longer than the tube 18 and has a stay bar 82 attached to its lower or inner end. The bar 82 is longer than the diameter of the tube 18 and abuts the inner radial end of the tube 18 when the cap 2 is disengaged from the tube 18. This limits the distance the cap 2 may be moved away from the tube 18 and maintains a connection between the cap 2 and the tube 18 to prevent loss of the cap 2.

The inner member 36 of each leg 34 includes an outer generally laterally extending portion 38 and a generally axially inwardly extending portion 40. The inner end of the axial portion 40 bends to form a semicylindrical spring abutment 42. The axial portion 40 has an opening 44 and a hole 46 extending therethrough.

The outer member 52 of the leg 34 has an outer portion 62 that extends axially inwardly from the mounting plate 70, a generally laterally extending portion 54, and a generally axially inwardly extending portion 56. The axial portion 56 terminates in a short generally lateral projection 58. In the assembled stem 32, the lateral portion 54 and axial portion 56 of the outer member 52 abut the lateral portion 38 and axial portion 40 of the inner member 36. A hole 60 extending through the axial portion 56 of the outer member 52 is aligned with the hole 46 in the axial portion 40 of the inner member 36. The fusible material 66 extends through the holes 46, 60 and engages the surrounding outer surfaces of the inner and outer members 36, 52 to hold the members 36, 52 in an interlocking position. The projection 58 on the outer member 52 is received into the opening 44 in the inner member 36. The abutting surfaces of the generally lateral portions 38, 54 form the main part of the mechanical interlock between the inner and outer members 36, 52. The interconnection between the projection 58 and the opening 44 helps make the mechanical interlock more secure.

A compression spring 78 is positioned between the cap body 4 and the stem 32. The outer end of the spring 78 abuts the spring abutment 14 formed on the cap body 4, and the inner end of the spring 78 abuts the spring abutments 42 formed by the curved outer ends of the inner members 36 of the legs 34. The spring 78 biases the valve plug 22 into the closed position shown in FIG. 3, in which it sealingly engages the cap body 4 to close the opening 6 in the body 4.

In the second preferred embodiment shown in FIGS. 6-8, the stem 32a has a single leg which extends axially inwardly from the radial center of the valve plug 22a. This leg has an inner member 36a and an outer member 52a which form the inner and outer portions of the stem 32a, respectively. A flat generally rectangular spring abutment 42a is integrally attached to the bottom end of the inner portion 36a. A mounting plate 70a is integrally attached to the top end of the outer member 52a. The leg members 36a, 52a, abutment 42a, and plate 70a are preferably formed from flat steel strips. A compression spring 78a extends between the spring abutment 42a and an abutment 14a formed in the body 4a of the cap 2a.

The inner member 36a of the stem 32a has an outer axial portion 37a and an inner axial portion 41a which are joined by a job 43a. The outer member 52a is similarly shaped with an outer axial portion 53a and an inner axial portion 57a joined by a jog 59a. In the assembled stem 32a, shown in FIGS. 6 and 7, the inner and outer members 36a, 52a abut each other along their corresponding axial and jog surfaces. The jogs 43a, 59a include generally laterally extending portions 39a, 55a that have abutting generally laterally extending surfaces which form a part of the mechanical interlock and transmit axial forces. The axial portions 37a, 41a, 53a, 57a of the inner and outer members 36a, 52a have aligned holes 46a, 60a extending radially therethrough. Plugs of fusible material 66a fill these holes 46a, 60a in the manner described above in connection with the first embodiment.

As described above, the stem 32b of the third preferred embodiment shown in FIGS. 9-14 has two opposite legs 34b. The inner member 36b of each leg 34b has an outer generally laterally extending portion 45b connected to a midportion 47b by a generally axially extending portion 48b. Inwardly of the midportion 47b, the inner member 36b extends generally axially inwardly and radially outwardly and terminates in a spring abutment 42b, similar to the abutment 42 shown in FIGS. 1-5, for engaging spring 78b. The midportion 47b is shaped to form a laterally facing recess or pocket 49b for receiving the fusible material 66b. Below the pocket 49b, a hole 50b extends laterally through the midportion 47b for the purpose described below.

Figure 11:
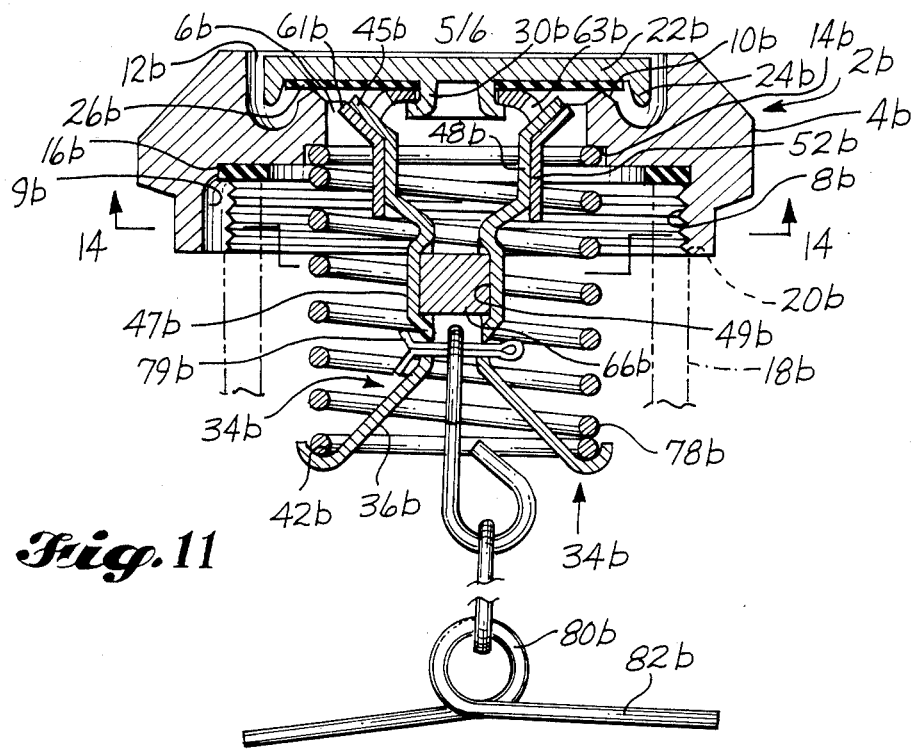
Figure 12:
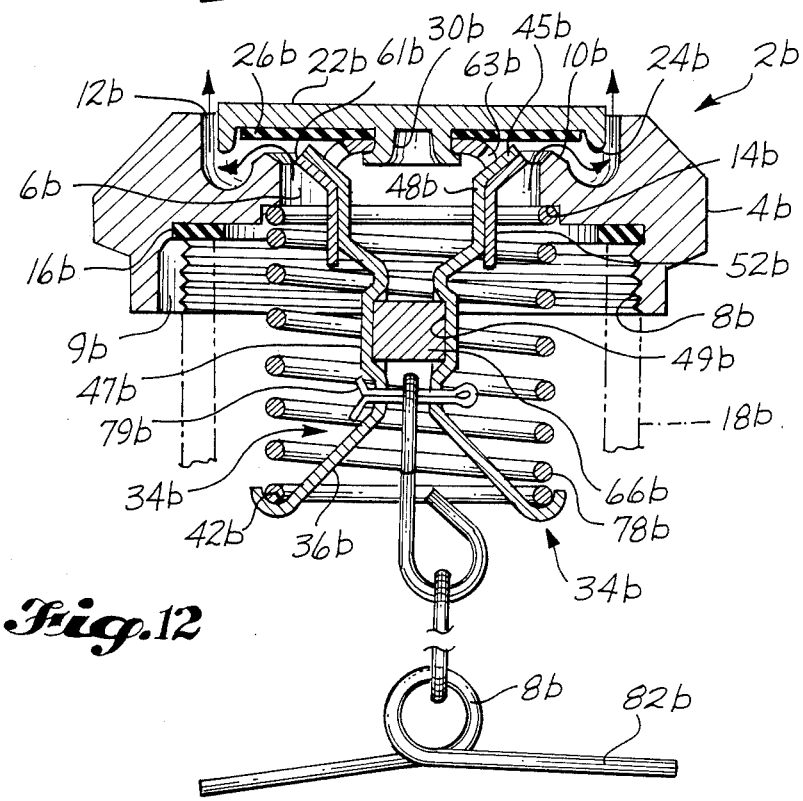
Figure 13:
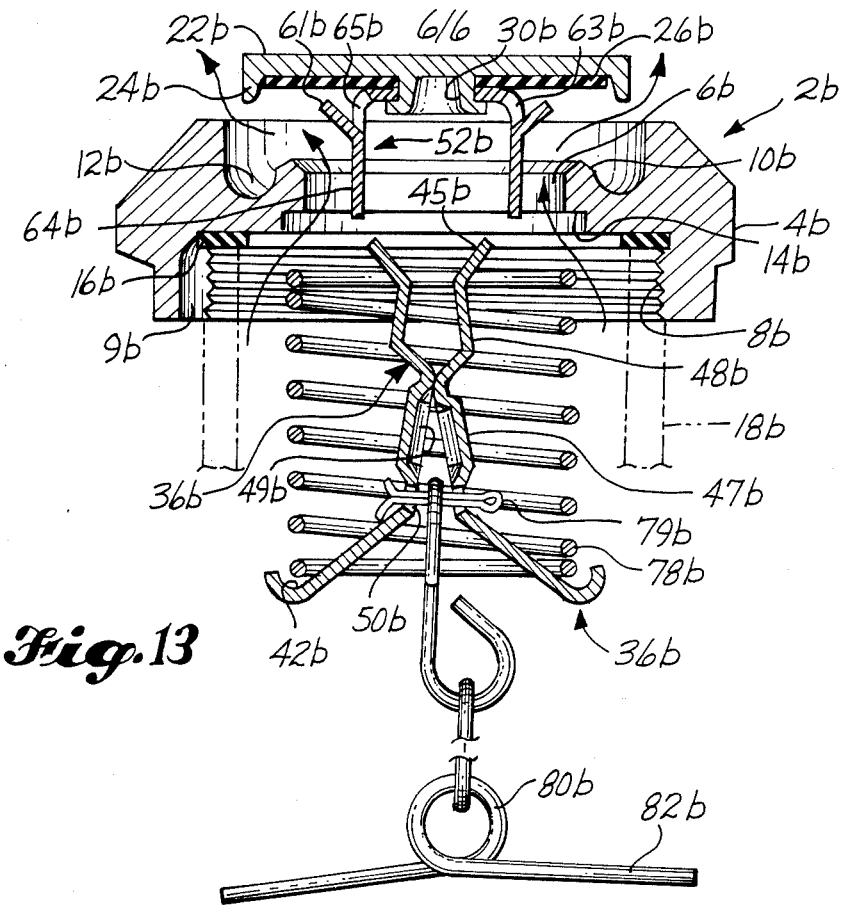
Figure 14:
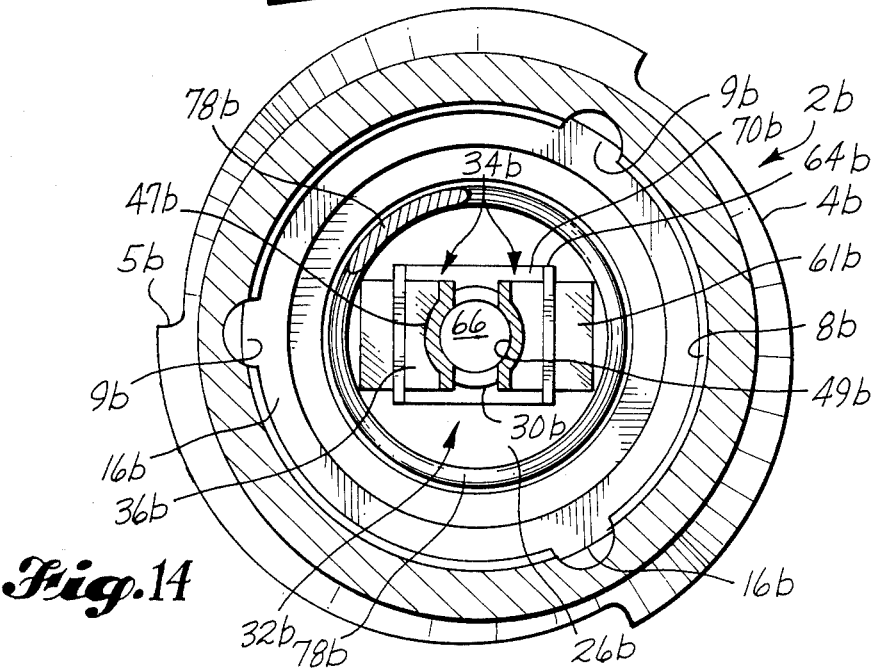
FIG. 14 is a sectional view taken along line 14—14 in FIG. 11.

The outer member 52b includes an axially extending portion 64b having an opening 63b extending laterally therethrough and a projection 61b extending generally laterally from the inner edge of the opening 63b. The upper or outer ends of the axial portions 64b of the two outer members 52b are connected by a mounting plate 70b. The mounting plate has a hole 73b extending axially therethrough for receiving a mounting projection 30b carried by the valve plug 22b. As can be seen in FIGS. 11-13, the projection 30b extends through the seal 26b and the mounting plate 70b and is crimped radially outwardly against the plate 70b to securely mount the seal 26b and the outer members 52b to the plug 22b. The inner and outer members 36b, 52b are preferably formed from flat steel strips.

The projection 61b and axial portion 64b of the outer member 52b form lateral and axial surfaces, respectively, that abut corresponding surfaces of portions 45b, 48b of the inner member 36b. The abutting generally lateral surfaces form the main portion of the mechanical interlock. The angles formed between the portions of each inner member 36b are chosen to minimize the compression load on the fusible material 66b and to ensure separation of the inner and outer portions 36b, 52b of the stem 32b when the fusible material 66b melts.

Preferably, the outer member 52b has substantially inwardly extending surfaces that abut opposite surfaces of the inner member 36b to inhibit movement of the surfaces of portions 45b, 48b of inner member 36b along the abutting surfaces of the outer member 52b. In the preferred embodiment shown in FIGS. 9-14, the substantially inwardly extending surfaces are formed by the side edges 65b which partially define the opening 63b. These side edges 65b are substantially perpendicular to the abutting surfaces of portions 45b, 48b, 64b and projection 61b. In the assembled stem 32b shown in FIGS. 11 and 12, the generally laterally extending portion 45b of each inner member 36b projects through the opening 63b in the corresponding outer member 52b. The opposite side edges 65b defining the opening 63b abut opposite side edge surfaces 51b of the inner member portion 45b. This preferred arrangement has the advantage of effectively maintaining the inner members 36b in position relative to the outer members 52b while maintaining simplicity of structure and ease of assembly. The outer members 52b and mounting plate 70b may conveniently be formed from a single strip of steel by cutting three sides of each opening 63b, bending the lateral projections 61b away from the openings 63b, and bending the outer members 52b relative to the mounting plate 70b.

In the preferred embodiment shown in FIGS. 9–14, the pockets 49b of the inner members 36b and the fusible material 66b are positioned axially inwardly of the outer members 52b for ease of assembly. In such an arrangement, the inner members 36b have a tendency to pivot about the top or outer edges of the body of fusible material 66b. Therefore, each inner member 36b is provided with the hole 50b mentioned above. The holes 50b are positioned inwardly of the fusible material 66b. A pin 79b slidably extends through the holes 50b to connect the inner members 36b to each other. This prevents the inner members 36b from pivoting about the edges of the body of fusible material 66b. The pin 79b performs the additional function of providing a means for attaching a chain 80b to the stem 32b. The chain 80b has a stay bar 82b attached to its inner end. The chain 80b and the stay bar 82b function in the manner of the chain 80 and the stay bar 82b function in the manner of the chain 80 and the stay bar 82 described above in connection with the embodiment shown in FIGS. 1–5.

Another preferred feature of the embodiment shown in FIGS. 9–14 is relief recesses 9b formed in the threads 8b of the cap body 4b. These recesses 9b are most clearly seen in FIG. 14. The recesses 9b form vent openings to relieve pressure in the tank before the cap 2b is fully disengaged. This prevents a sudden rush of pressure when the disengagement of the cap 2b is completed.

The operation of each of the embodiments of the valve is as follows. The spring 78, 78a, 78b exerts an inward force on the inner portion 36, 36a, 36b of the stem 32, 32a, 32b to put the stem 32, 32a, 32b in tension and bias the valve plug 22, 22a, 22b into a position in which it closes the opening 6, 6a, 6b in the cap body 4, 4a, 4b. FIGS. 3, 6, and 11 show the valve plug 22, 22a, 22b in its normal closed position. When there is increased pressure in the tank in which the tube 18, 18a, 18b is installed, the valve plug 22, 22a, 22b and attached stem 32, 32a, 32b move axially outwardly against the force of the spring 78, 78a, 78b, as shown in FIGS. 4, 7, and 12. This relieves pressure in the tank. When the pressure has been relieved, the spring 78, 78a, 78b returns the valve plug 22, 22a, 22b to its closed position. The spring 78, 78a, 78b is calibrated to provide pressure relief when the pressure in the tank rises above a predetermined level. For example, in an active pressure relief system intended mainly for safety in catastrophic accident situations, the spring 78, 78a, 78b might be calibrated to provide relief when the pressure exceeds 5 psig.

FIGS. 16 and 17 illustrate the functioning of a preferred feature of each of the three embodiments in an accident situation. FIG. 16 illustrates an overturned tank 100 equipped with a cap 2 into which a relief valve constructed in accordance with the invention is incorporated. The valve plug 22 has moved outwardly, in this case downwardly, against the force of the biasing means to vent pressure in the tank 100. As is illustrated in FIG. 16, the fuel spillage 106 from the tank 100 is in a substantially cylindrical pattern. By contrast, FIG. 15 shows spillage from a tank 100 equipped with a prior art cap 102. Fuel is spilling from the tank 100 in a frustoconical configuration 104. This pattern 104 causes the fuel to spread out over a much wider area than it would with the cylindrical spillage pattern 106 shown in FIG. 16. The limiting of spilled fuel to a relatively confined area, as shown in FIG. 16, is of course highly desirable in an accident situation. The manner in which the cylindrical spillage pattern 106 is accomplished is illustrated in FIG. 17. The peripheral flange 24 of the valve plug 22 and the flange-receiving recess 12 of the cap body 4 are dimensioned so that, when the stem 32 and the valve plug 22 move outwardly to relieve pressure in the tank 100, a portion of the flange 24 continues to project into the recess 12. This forces spilling fuel to follow the flow path indicated by the arrows in FIG. 17 and results in the desirable cylindrical spillage pattern 106.

The axial tension forces created by the biasing force of the spring 78, 78a, 78b are transmitted between the inner and outer members 36, 36a, 36b, 52, 52a, 52b through the mechanical interlock formed by the abutting generally lateral surfaces of portions 38, 39a, 45b, 54, 55a, 61b. The abutment of these surfaces provides a direct transmission of axial forces between the members 36, 36a, 36b, 52, 52a, 52b so that the fusible material 66, 66a, 66b does not carry the axial load. Since the fusible material 66, 66a, 66b is not required to carry the relatively large axial load, it can be chosen for its temperature-related, as opposed to load-carrying characteristics. The material 66, 66a, 66b is chosen to melt at elevated temperatures exceeding a predetermined level, for example 255° F. for diesel tanks.

When the temperature in the tank exceeds the predetermined level, the fusible material 66, 66a, 66b melts to allow the inner and outer portions 36, 36a, 36b, 52, 52a, 52b of the stem 32, 32a, 32b to separate from each other. The elevated pressure associated with the elevated temperature in the tank moves the valve plug 22, 22a, 22b and the outer portion 52, 52a, 52b of the stem 32, 32a, 32b outwardly away from the axial opening 6, 6a, 6b in the cap 2, 2a, 2b so that gas or liquid can be discharged from the tank to thereby avoid an explosion. The expansion of the spring 78, 78a, 78b aids the separation of the inner and outer portions 36, 36a, 36b, 52, 52a, 52b and reinforces the action of gravity in causing the inner members 36, 36a, 36b to drop down into the tank. FIGS. 5, 8, and 13 show the positions of the valve members after the fusible material 66, 66a, 66b has melted and the inner and outer portions 36, 36a, 36b, 52, 52a, 52b have separated from each other. In the embodiment shown in FIGS. 1–5, the stay bar 82 functions to limit the distance the valve plug 22 moves away from the opening 6.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. A pressure relief valve for a tank comprising:
   a valve plug positioned outwardly of an opening in the tank;
   a stem having an outer portion attached to the valve plug, and an inner portion; and
   biasing means for exerting an axial, inward force on the inner portion of the stem to put the stem in tension and bias the valve plug into a position in which it closes the opening;

said inner and outer portions of the stem having means forming a mechanical interlock to transmit axial forces directly to each other, and said stem including fusible material positioned to maintain said inner and outer portions in a mechanically interlocking position; said biasing means being resilient to allow the stem and the valve plug to move outwardly in response to increased pressure in the tank to relieve pressure in the tank; and said fusible material being meltable at elevated temperatures exceeding a predetermined level, to allow said inner and outer portions to separate from each other and the valve plug and said outer portion to move away from the opening.

2. A valve as recited in claim 1, in which said means forming a mechanical interlock comprises generally laterally extending surface portions of said inner portion, and generally laterally extending surface portions of said outer portion abutting said surface portions of said inner portion to transmit axial forces; and in which said inner and outer portions have adjacent hole means, and the fusible material fills said hole means to maintain said inner and outer portions in a mechanically interlocking position.

3. A valve as recited in claim 1, in which said means forming a mechanical interlock comprises generally laterally extending surface portions of said inner portion, and generaly laterally extending surface portions of said outer portion abutting said surface portions of said inner portion to transmit axial forces; and in which said inner and outer portions have adjacent generally inwardly extending portions with hole means extending therethrough, and the fusible material fills said hole means to maintain said inner and outer portions in a mechanically interlocking position.

4. A valve as recited in claim 1, in which the stem comprises a plurality of peripherally spaced legs each of which includes an inner member and an outer member, said inner members forming said inner portion, and said outer members forming said outer portion.

5. A valve as recited in claim 4, in which said inner members bend at their inner ends to form a spring abutment for the biasing means.

6. A valve as recited in claim 4, in which said means forming a mechanical interlock comprises, in each leg, generally laterally extending surface portions of the inner member, and generally laterally extending surface portions of the outer member abutting said surface portions of the inner member to transmit axial forces; and in which the inner and outer members of each leg have adjacent hole means, and the fusible material fills said hole means to maintain said inner and outer members in a mechanically interlocking position.

7. A valve as recited in claim 4, in which, in each leg, the inner and outer members abut each other along surface portions that extend generally laterally, to form a part of the mechanical interlock, and then generally inwardly; the outer member terminates at its inner end in a generally lateral projection; the inner member has an opening for receiving said projection; and the fusible material fills hole means extending generally laterally through the inner and outer members to maintain the inner and outer members in a mechanicaly interlocking position.

8. A valve as recited in claim 4, in which said means forming a mechanical interlock comprises, in each leg, generally laterally extending surface portions of the inner member, and generally laterally extending surface portions of the outer member abutting said surface portions of the inner member to transmit axial forces; and in which the fusible material is positioned laterally between the legs to maintain the legs in a laterally spaced position and said inner and outer members in a mechanically interlocking position.

9. A valve as recited in claim 8, in which, in each leg, the outer member has substantially inwardly extending surfaces that are substantially perpendicular to said surface portions and abut opposite surfaces of the inner member to inhibit movement of said surface portions of the inner member along said surface portions of the outer member.

10. A valve as recited in claim 8, in which the inner member of each leg has a generally inwardly extending portion with a laterally facing recess, and the fusible material extends into said recess.

11. A valve as recited in claim 10, in which, in each leg, the outer member has substantially inwardly extending surfaces that are substantially perpendicular to said surface portions and abut opposite surfaces of the inner member to inhibit movement of said surface portions of the inner member along said surface portions of the outer member.

12. A valve as recited in claim 4, in which, in each leg, the inner and outer members abut each other along surface portions that extend generally laterally, to form a part of the mechanical interlock, and then generally inwardly; and in which the fusible material is positioned laterally between the inner members to maintain the inner members in laterally spaced position and the inner and outer members in a mechanically interlocking position.

13. A valve as recited in claim 12, in which, in each leg, the outer member has substantially inwardly extending surfaces that are substantially perpendicular to said surface portions and abut opposite surfaces of the inner member to inhibit movement of said surface portions of the inner member along said surface portions of the outer member.

14. A valve as recited in claim 12, in which the inner member of each leg has a generally inwardly extending portion with a laterally facing recess, and the fusible material extends into said recess.

15. A valve as recited in claim 14, in which, in each leg, the outer member has substantially inwardly extending surfaces that are substantially perpendicular to said surface portions and abut opposite surfaces of the inner member to inhibit movement of said surface portions of the inner member along said surface portions of the outer member.

16. A valve as recited in claim 13, in which, in each leg, the outer member has a generally inwardly extending portion with an interlock opening extending laterally therethrough and partially defined by an inner edge and opposite side edges, and a generally laterally extending portion extending from said inner edge of said interlock opening; the inner member has a generaly laterally extending portion that projects through said interlock opening; and said opposite side edges form said substantially inwardly extending surfaces.

17. A valve as recited in claim 12, in which the fusible material is positioned inwardly of the outer members, each inner member has a hole extending laterally therethrough inwardly of the fusible material, and the stem includes pin means slidably extending through said holes to connect the inner members to each other.

18. In a cap for closing a fuel tank filling and venting tube of the type having a main body with a central axial opening and means for detachably engaging said tube, and a pressure relief valve with a valve plug positioned outwardly of said opening, a stem attached to the valve plug, and biasing means for exerting an inward force on the stem to put the stem in tension and bias the valve plug into a position in which it closes said opening, the improvement comprising:

an inner portion of the stem including a first component of a mechanical interlock, an outer portion of the stem including a second component of said mechanical interlock, and fusible material positioned to maintain said inner and outer portions in a mechanically interlocking position to transmit axial forces directly between said inner and outer portions; said biasing means being resilient to allow the stem and the valve plug to move outwardly in response to increased pressure in the tank to relieve pressure in the tank; and said fusible material being meltable at elevated temperatures exceeding a predetermined level, to allow said inner and outer portions to separate from each other and the valve plug and said outer portion to move away from said opening.

19. The invention recited in claim 18, in which said first component of the mechanical interlock comprises generally laterally extending surface portions of said inner portion, and said second component comprises generally laterally extending surface portions of said outer portion abutting said surface portions of said inner portion to transmit axial forces; and in which said inner and outer portions have adjacent generally inwardly extending portions with hole means extending therethrough, and the fusible material fills said hole means to maintain said inner and outer portions in a mechanically interlocking position.

20. The invention recited in claim 18, in which the stem comprises a plurality of peripherally spaced legs each of which includes an inner member and an outer member, said inner members forming said inner portion, and said outer members forming said outer portion.

21. The invention recited in claim 20, in which said inner members bend at their inner ends to form a spring abutment for the biasing means.

22. The invention recited in claim 20, in which said first component of the mechanical interlock comprises generally laterally extending surface portions of the inner member of each leg, and said second component comprises generally laterally extending surface portions of the outer member of each leg abutting said surface portions of the inner member to transmit axial forces; and in which the inner and outer members of each leg have adjacent hole means, and the fusible material fills said hole means to maintain said inner and outer members in a mechanically interlocking position.

23. The invention recited in claim 20, in which, in each leg, the inner and outer members abut each other along surface portions that extend generally laterally, to form a part of the mechanical interlock, and then generally inwardly; the outer member terminates at its inner end in a generally lateral projection; the inner member has an opening for receiving said projection; and the fusible material fills hole means extending generally laterally through the inner and outer members to maintain the inner and outer members in a mechanically interlocking position.

24. The invention recited in claim 20, in which said first component of the mechanical interlock comprises generally laterally extending surface portions of the inner member of each leg, and said second component comprises generally laterally extending surface portions of the outer member of each leg abutting said surface portions of the inner member to transmit axial forces; and in which the fusible material is positioned laterally between the legs to maintain the legs in a laterally spaced position and said inner and outer members in a mechanically interlocking position.

25. The invention recited in claim 24, in which the inner member of each leg has a generally inwardly extending portion with a laterally facing recess, and the fusible material extends into said recess.

26. the invention recited in claim 20, in which, in each leg, the inner and outer members abut each other along surface portions that extend generally laterally, to form a part of the mechanical interlock, and then generally inwardly; and in which the fusible material is positioned laterally between the inner members to maintain the inner members in a laterally spaced position and the inner and outer members in a mechanically interlocking position.

27. The invention recited in claim 26, in which, in each leg, the outer member has substantially inwardly extending surfaces that are substantially perpendicular to said surface portions and abut opposite surfaces of the inner member to inhibit movement of said surface portions of the inner member along said surface portions of the outer member.

28. The invention recited in claim 26, in which the inner member of each leg has a generally inwardly extending portion with a laterally facing recess, and the fusible material extends into said recess.

29. The invention recited in claim 27, in which, in each leg, the outer member has a generally inwardly extending portion with an interlock opening extending laterally therethrough and partially defined by an inner edge and opposite side edges, and a generally laterally extending portion extending from said inner edge of said interlock opening; the inner member has a generally laterally extending portion that projects through said interlock opening; and said opposite side edges form said substantially inwardly extending surfaces.

30. The invention recited in claim 26, in which the fusible material is positioned inwardly of the outer members, each inner member has a hole extending laterally therethrough inwardly of the fusible material, and the stem includes pin means slidably extending through said holes to connect the inner members to each other.

31. The invention recited in claim 18, in which the valve plug has an inwardly extending peripheral flange, and the body of the cap has an annular recess surrounding said opening for receiving said flange; said flange and said recess being dimensioned so that, when the stem and the valve plug move outwardly to relieve pressure in the tank, a portion of said flange continues to project into said recess, to cause fuel spillage from the tank, when the tank is in an overturned position, to be in a substantially cylindrical pattern.

* * * * *

UNITED STATES PATENT AND TRADEMARK OFFICE
CERTIFICATE OF CORRECTION

PATENT NO. : 4,732,188

DATED : March 22, 1988

INVENTOR(S) : Zdenek Gabrlik, John M. Morris, Nelson O. Phillips and Timothy L. Oliphant It is certified that error appears in the above-identified patent and that said Letters Patent are hereby corrected as shown below:

On the cover page, under "References Cited, U.S. PATENT DOCUMENTS", add:

| | | |
|---|---|---|
| 1,994,770 | 3/1935 | King |
| 2,489,787 | 11/1949 | Knowlton |
| 3,669,302 | 6/1972 | Markarian |
| 3,918,606 | 11/1975 | Keller |
| 4,325,398 | 4/1982 | Green |
| 4,457,325 | 7/1984 | Green |
| 4,458,711 | 7/1984 | Flider |
| 4,487,215 | 12/1984 | Green |

Column 2, line 26, "reset" should be -- rest --.

Column 4, line 12, "portins" should be -- portions --.

Column 6, line 25, after "interlock", the following should be inserted:

-- to transmit axial forces directly to each other. The inner portion 36, 36a, 36b includes a first component of the mechanical interlock, and the outer portion 52, 52a, 52b includes a second component of the mechanical interlock --.

Column 7, line 64, "job" should be -- jog --.

UNITED STATES PATENT AND TRADEMARK OFFICE
CERTIFICATE OF CORRECTION

PATENT NO. : 4,732,188
DATED : March 22, 1988
INVENTOR(S) : Zdenek Gabrlik, John M. Morris, Nelson O. Phillips and Timothy L. Oliphant Page 2 of 2

It is certified that error appears in the above-identified patent and that said Letters Patent are hereby corrected as shown below:

Column 9, lines 25 and 26, after "stay bar", delete "82b function in the manner of the chain 80 and the stay bar".

Claim 12, column 12, line 33, after "in", insert -- a --.

Claim 16, column 12, 8th line from the bottom, "generaly" should be -- generally --.

Claim 26, column 14, line 19, "the" should be -- The --.

Signed and Sealed this

Thirteenth Day of September, 1988

Attest:

DONALD J. QUIGG

*Attesting Officer*

*Commissioner of Patents and Trademarks*